US005762596A

United States Patent [19]

Dittli

[11] Patent Number: 5,762,596

[45] Date of Patent: Jun. 9, 1998

[54] ROTATING CUTTING APPARATUS

[75] Inventor: Oskar Dittli, Echandens, Switzerland

[73] Assignee: Bobst SA, Lausanne, Switzerland

[21] Appl. No.: 632,386

[22] Filed: Apr. 10, 1996

[30] Foreign Application Priority Data

Apr. 15, 1995 [CH] Switzerland .......................... 01078/95

[51] Int. Cl.[6] ............................ B31B 35/00; B65G 15/10

[52] U.S. Cl. .......................... 493/353; 198/817; 493/362; 493/365; 493/369; 493/370

[58] Field of Search .................................... 493/352, 353, 493/362, 363, 364, 365, 369, 370, 372; 83/271, 25, 103; 225/96, 104; 198/817

[56] References Cited

U.S. PATENT DOCUMENTS

| | | | |
|---|---|---|---|
| 1,715,301 | 5/1929 | Mason | 198/817 |
| 2,765,713 | 10/1956 | Anness . | |
| 4,524,658 | 6/1985 | Focke et al. . | |
| 4,561,334 | 12/1985 | Sarka | 83/103 |
| 4,561,579 | 12/1985 | Fleming, III | 225/96 |
| 4,770,284 | 9/1988 | Boss | 198/339.1 |
| 5,183,144 | 2/1993 | Francioni | 198/817 |
| 5,336,154 | 8/1994 | Focke | 493/352 |

FOREIGN PATENT DOCUMENTS

| | | | |
|---|---|---|---|
| 0 109 582 | 5/1984 | European Pat. Off. . | |
| 0 595 258 | 5/1994 | European Pat. Off. . | |
| 0 680 821 | 11/1995 | European Pat. Off. . | |
| 97052 | 7/1897 | Germany . | |
| 606111 | 11/1934 | Germany . | |
| 185155 | 11/1935 | Switzerland . | |
| 1122708 | 8/1968 | United Kingdom | 83/103 |
| 2 256 828 | 12/1992 | United Kingdom . | |
| WO 91/04139 | 4/1991 | WIPO . | |

*Primary Examiner*—Jack W. Lavinder

*Attorney, Agent, or Firm*—Hill & Simpson

[57] ABSTRACT

A rotating cutting apparatus has an arrangement for controlling and finishing the cutting which is arranged between a cutting station and a receiving station. This arrangement includes a conveying arrangement for box blanks, an arrangement for acting on the cut flaps of the box blanks to bend them out of the plane of the blank and an arrangement for pressing the flaps back into the plane of the blank.

18 Claims, 6 Drawing Sheets

ROTATING CUTTING APPARATUS

BACKGROUND OF THE INVENTION

The present invention is directed to a rotating cutting apparatus for processing materials such as paper or cardboard.

In the field of processing paper or cardboard for the purpose of producing packaging blanks, machines are already in use and generally comprise a series of stations arranged in sequence which include a supply station, a station for conditioning the material to be processed, one or more printing stations, a station for embossing, pressing and cutting the cardboard and/or paper and finally a receiving or delivery station for the box blanks produced by the machine. In order to obtain a box blank that will be useful without problems by the packaging machine that will be using the box blank, one of the important conditions with the processing machine of this type concerns the insurance of the correct implementation of the cutting.

In these machines, the embossing, pressing and cutting station is generally made up as lateral supporting members into which are sequentially inserted cartridges equipped with rotating members for embossing, pressing and cutting. The cartridge that carries out the embossing is provided with an upper cylindrical embossing member or roll which is generally the female part and with a lower rotating embossing member or roll which is the male part. The cartridge that carries out the pressing comprises an upper cylindrical pressing member or roll generally the male part, and a lower rotating pressing member or roll which is the female part. The cartridge for carrying out the cutting comprises an upper cylindrical roll or member, generally a male part, and a lower cutting member or roll that represents a smooth cylindrical surface.

As a rule, the embossing and pressing operations are well controlled and pose no problems. However, this is not true of the cutting operation. Because the cutting operation, which may be realized according to two cutting principles, is strongly dependent on the quality of the paper or cardboard which is being processed, this creates one of the problems with the cutting operation. Another factor to be taken into account concerns the deformation of the means used. This deformation, in particular buckling, will occur from the thermal stresses caused by the friction in the bearings of the cartridge and in the mechanical conveying equipment of the apparatus. In order to understand the effect of even a very slight buckling of the cutting means, an explanation of the two cutting principles is in order.

The first of these principles is based on a shearing of the paper or cardboard at the cutting point. In order to implement this principle, an upper rotating member is used and has a cylindrical surface which is machined so as to present threads or cutting rules having a substantially rectangular cross section and being arranged in the shape and dimension of the cuts to form the box blank. This upper means works together with a rotating lower means which also has threads or rules having a substantially rectangular cross section according to the arrangement coupled with that of the upper member, but however, having a slight displacement so that the edges of the two cooperating rules overlap somewhat. In order to produce the cut, the center distance of the axes between the two members must be determined very precisely in order to maintain a spacing between the cutting surfaces of the rules of the two respective members so that the shearing of the paper or cardboard is realized. This spacing, which depends among other things on the quality of the material being processed, lies between 0.05 and 0.2 millimeters depending on the thickness of the paper or cardboard.

The second cutting principle is based on a crushing or pinching of the paper or cardboard at the location of the cut. In order to implement this principle, the upper rotating member is used and has a cylindrical surface machine so as to present threads or rules having a substantially triangular cross section to present a knife like edge and which are arranged according to the shape and dimensions of the box blank to be formed. This upper member works together with a lower rotating member that represents a smooth cylindrical surface. In order to produce the cut, the center distance of the axes between the two rotating members must be very precisely determined in order to maintain the spacing between the respective members so that the pinching or crushing of the paper or cardboard is realized. This spacing, which depends among other things on the quality of the material being processed, lies in a range of 0 and 0.01 millimeters.

Even if the precision of the required spacing between the cutting faces of the members is maintained, the problems of buckling and wear of the members causes a loss of this precision and leads to a poor cutting quality and even causes in certain cutting areas, a failure to cut completely, which is not controllable and, of course, is unacceptable.

SUMMARY OF THE INVENTION

The object of the present invention is to overcome the above-mentioned disadvantages so that the box blanks being produced are free of all cutting flaws. This object is achieved by means of an improvement in a rotating cutting apparatus for processing material including paper and cardboard and which apparatus includes stations arranged in sequence including a supply station, a station for conditioning the material to be processed, a printing station, a station for embossing, pressing and cutting and finally a station for receiving the objects produced by the machine. The improvements are means for controlling and finishing the cutting being arranged between the cutting station and the receiving station, said means for controlling and finishing of the cutting comprising conveying means for the box blanks, means for acting on flaps cut in each of the box blanks to bend the flap out of the plane of the blank and means for rolling the box blanks to move any flaps back into the plane of the blank.

Other advantages and features are apparent from the following descriptions of the preferred embodiments, the drawings and claims.

DESCRIPTION OF THE PREFERRED EMBODIMENTS

Figure 1:
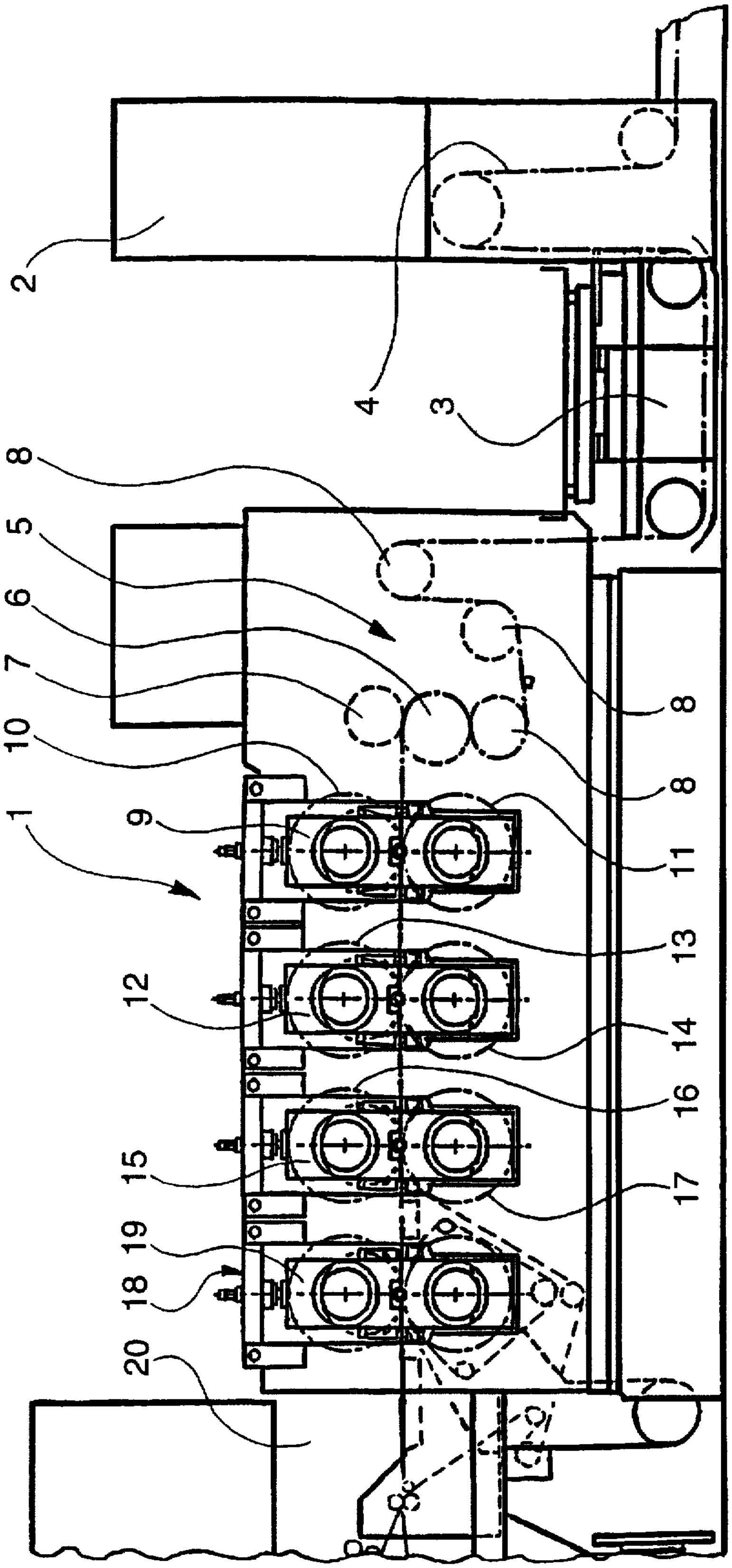
FIG. 1 is a general schematic side view of rotating cutting apparatus having an embossing, pressing and cutting station which is equipped with a means for controlling the cutting and finishing of the cut blanks being produced in the apparatus.

The principles of the present invention are particularly useful when incorporated in an embossing, pressing and cutting station generally indicated at 1 in FIG. 1 of a machine for production of package means such as box blanks which station is equipped with means generally indicated at 18 for controlling and finishing of a cutting.

The embossing, pressing and cutting station 1 is made up of a module 2 for controlling the quality of the printing followed by a guidance and conditioning arrangement 3 for a cardboard strip or web 4. The cardboard strip or web 4 subsequently passes into an entry installation generally indicated at 5 which has driven rolls 6 and 7 and three idler rolls 8. This entry installation 5 precedes a first embossing cartridge 9 which is equipped with an upper rotating member or cylinder 10 and a lower rotating cylinder or member 11. The cartridge 9 is followed by a pressing cartridge 12 which has an upper rotating member or cylindrical roll 13 and a lower rotating member or roll 14. The pressing cartridge precedes a cutting cartridge 15 which has an upper rotating cutter means and a lower smooth rotating anvil 17. The cutting cartridge 15 is followed by means 18 for controlling and finishing of a cutting which can itself be inserted in a cartridge 19 of a similar construction to the embossing cartridge 9, the pressing cartridge 12 and the cutting cartridge 15. Box blanks, which are produced in the embossing pressing and cutting station 1, are subsequently separated laterally and longitudinally from one another in a separating station 20 and are then received in a receiving or delivery station which is not shown.

Figure 2:
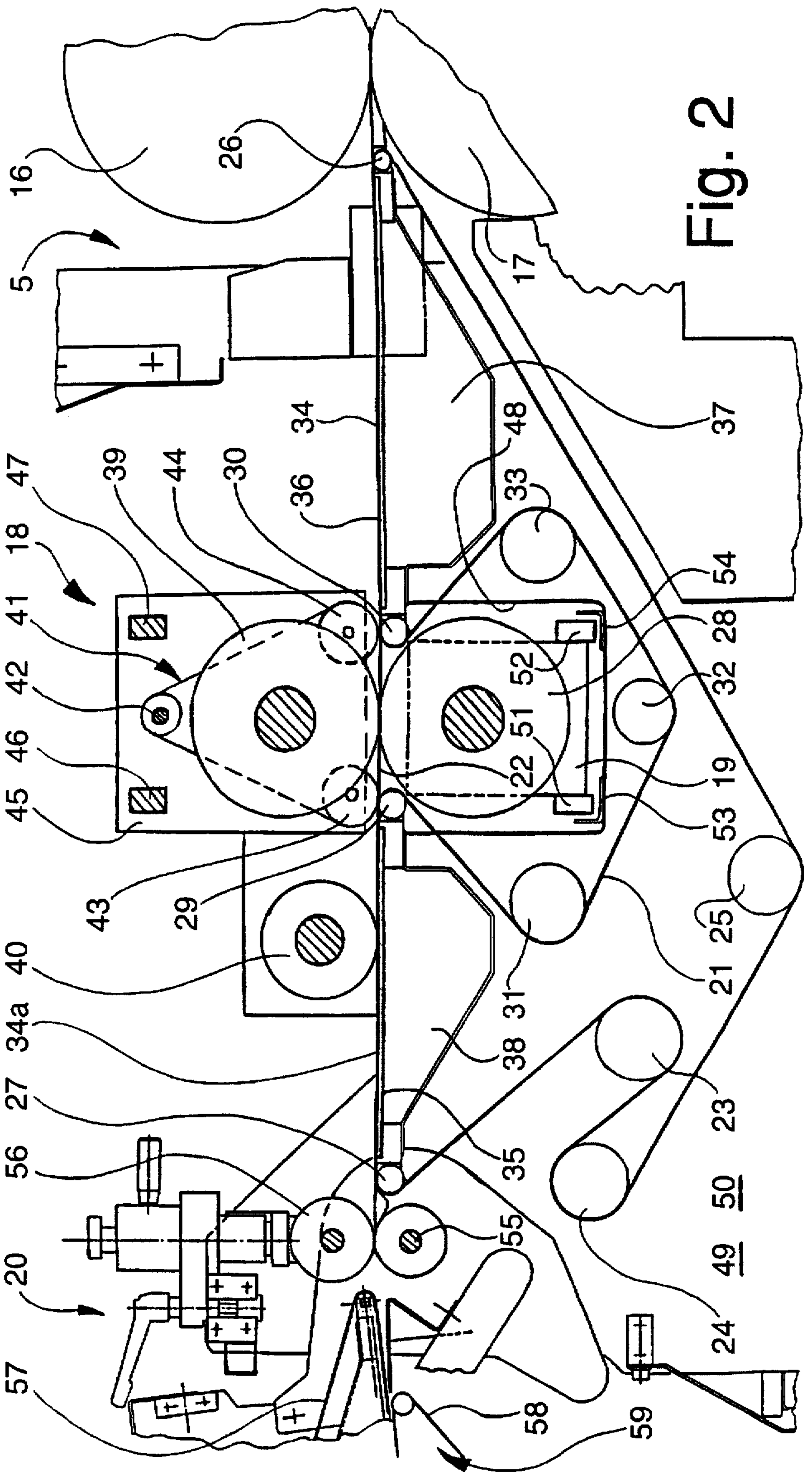
FIG. 2 is a schematic side view of the means for controlling and finishing the cutting with portions broken away for purpose of illustrations.
Figure 3:
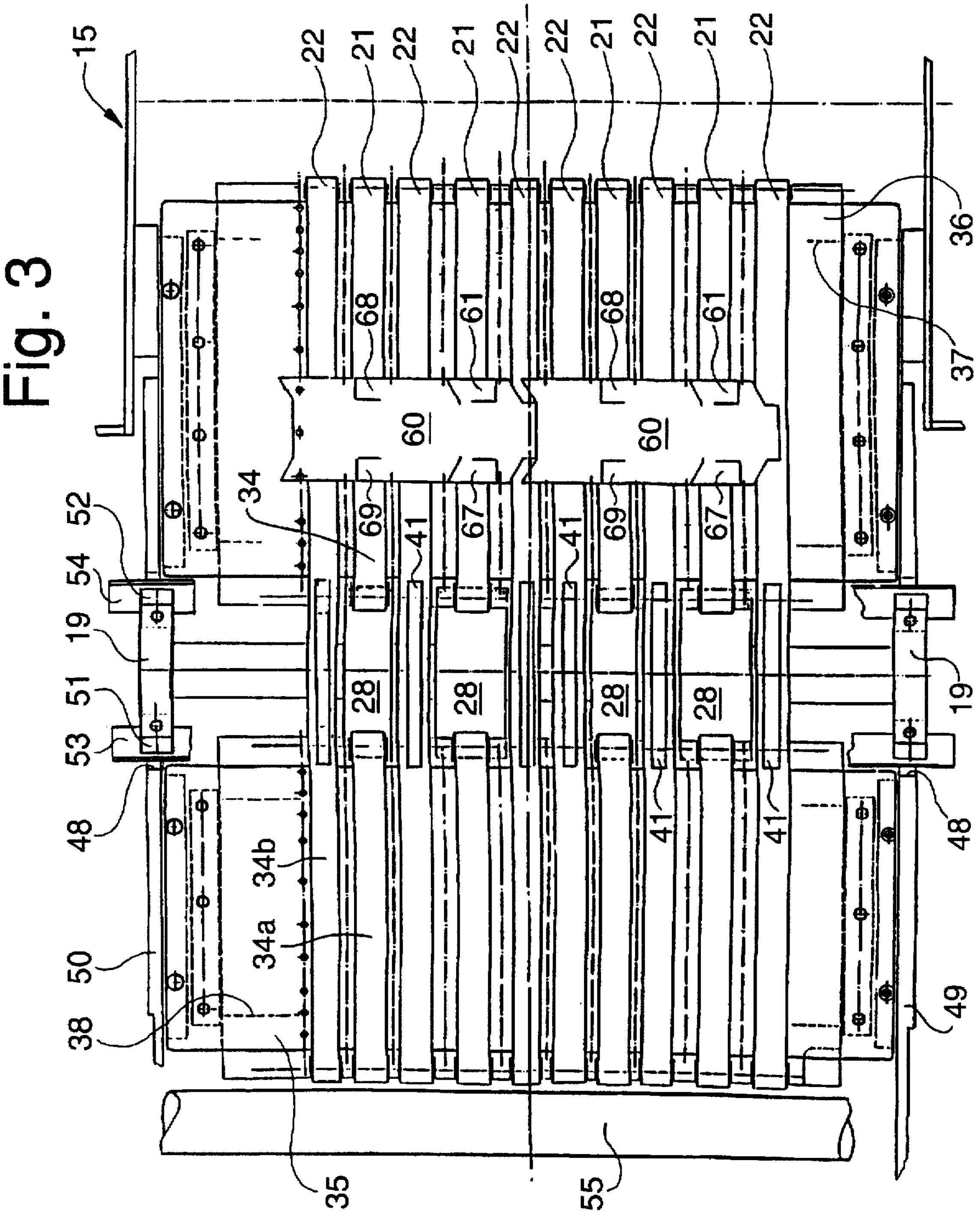
FIG. 3 is a top plan view of the means for controlling and finishing the cutting illustrated in FIG. 2.

As illustrated in FIGS. 2 and 3, the means 18 for controlling and finishing the cutting are arranged subsequent to the upper rotating cutting means 16 and to the lower rotating smooth anvil 17 of the cutting station.

The means 18 for controlling and finishing the cutting comprises a conveying means made up of a plurality of belt conveyors 21 and 22 which are arranged side by side across the width of the machine as illustrated in FIG. 3 with the conveyors 22 being positioned between adjacent conveyors 21. The belts of the conveyors 21 and 22 are carried by a common roller 23 (FIG. 2) that extends between two lateral supporting members of the arrangement. These belts pass in their lower circuit around the two returning idlers 24 and 25. The two ends of the belt conveyors 21 and 22 are equipped with rollers having a small diameter rollers 26 and 27 which have small diameters and are arranged in such a manner to permit the conveying of a box blank 60 (see FIG. 3). The conveyors 21 are arranged so that they do not interfere with the lower members 28 of the control and finishing means 18. For this purpose, the respective belts passed around two end rollers 29 and 30 which have small diameters and are situated in a vicinity of the members 28 and thus form a gap through which the members 28 may extend. As illustrated in FIG. 2, the belts 21 after passing around the member or roller 29 extends around three idlers 31, 32 and 33 until it is again engaged on the roller 30. Thus, each of the belts 21 has a run 34 which extends between the roller 30 to the roller 26 and a second run **34*a* which extends between the rollers 27 and 29. The belts 22 however, have a continuous run 34*b* as best illustrated in FIG. 3 which extends from the rollers 26 to the rollers 27. In the area of the run 34, the belts 21 pass over a support plate or panel 36 while in the area of the run 34*a*, the belts 21 pass over a support plate or panel 35. The belts 22 pass over these two support plates 35 and 36. In order to ensure a better conveying of a box blank 60, a vacuum chamber 37 is disposed underneath the panel or plate 36 while a vacuum chamber 38 is positioned under the plate 35**.

The heart of the means 18 for controlling and finishing the cutting is formed by an upper rotating member 39 for controlling and finishing the cutting which works together with the lower rotating member 28. Also, included is a pressure roller 40 which acts on each of the box blanks so as to roll them between the circumference of the roller 40 and the carrying run **34*a* of the belt conveyors 21 and 22 which are supported on the support panel 35. As best illustrated in FIG. 3, the rotating members 28 and 39 are arranged in pairs along a transverse axle depending on the structure of the box blank and the conveyor belts 22** extend between these pairs.

In order to obtain a good conveying of the box blank 60 in the region of the rotating members 28 and 39, a small upper conveyor element 41 has been placed between each of the pairs of rotating members 28 and 39 to cooperate with the belt conveyors 22. The belts 41 are carried by an upper transverse roller 42 and pass around rollers 43 and 44 which are arranged above the rollers 29 and 30, respectively. Thus, the run extending between the rollers 43 and 44 of each of the belt conveyors 41 are in contact with the belt 22 as it traverses the space between the rollers 29 and 30. The upper conveying elements such as 41 have their rollers mounted on shafts which are fixed on a cheek or side wall 45 which are spaced apart by cross bars 46 and 47. The rotating members 28 and 39 are arranged in a cartridge 19 which is inserted in a cut out or notch 48 of the lateral supporting members or walls 49 and 50 of a frame of the station 1. The cartridge 19 is equipped with casters or rollers 51 and 52 which are guided in tracks formed by angled brackets 53 and 54.

The pressure roller 40 may also be supported by bearings (not shown) which are mounted on the supporting members of the cartridge 19. It should also be mentioned that this pressure roller 40 may also be supported by bearings mounted on the lateral supporting members or walls 49 and 50 of the frame for the station 1.

After being rolled by the roller 40, the box blanks 60 are introduced into a separating arrangement 20, which comprise a lower roller 55 and an upper roller 56 whose pressure can be regulated. These two rollers 55 and 56 are moving at a circumferential speed that is higher than the linear speed of the box blanks coming out of the means 18 so as to cause a longitudinal separation of the box blanks before introducing the blank between upper and lower belts 57, 58 having a known fan-shaped lateral separation arrangement.

Figure 4:
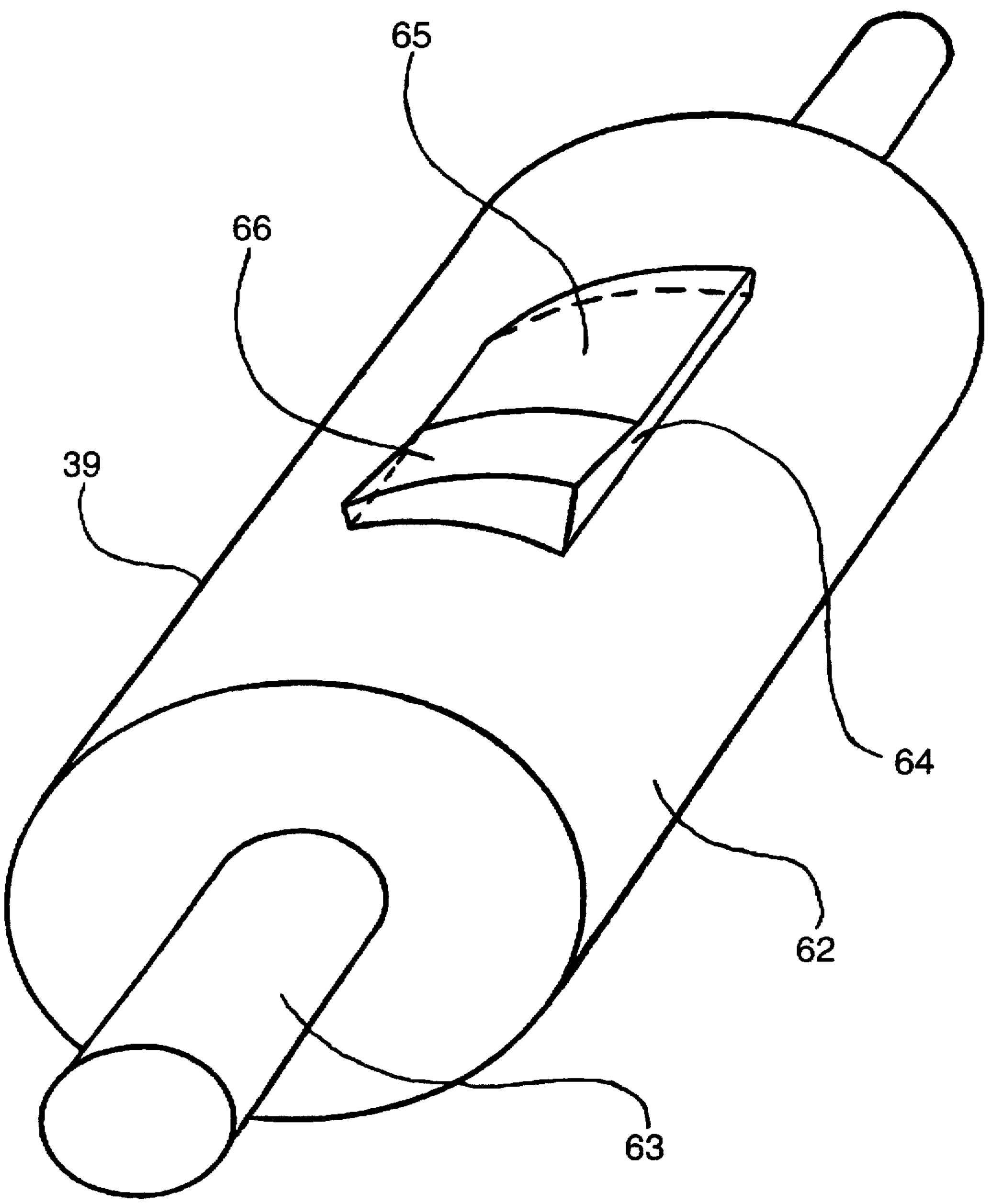
FIG. 4 is a perspective view of a cutting part of the upper member for the means for controlling and finishing of the cutting of a first type of flap of a box blank.

FIG. 4 is a perspective view of a one of the cutting parts of an upper means or member rotating member 39 for the controlling and finishing of a cut. In particular, the part is designed for processing a first flap 61 of the box blank 60 as shown in FIG. 3. This upper rotating member 39 is made up of a cylindrical body 62 which is maintained in a rotational position by known means such as set collars or retaining keys or cotter pins on a transverse shaft 63. This cylindrical body 62 is arranged so as to present at least one protuberance 64 whose geometry is defined according to the shape of the flap 61 which is to be processed. In this case of the first flap 61, the protuberance 64 presents a surface composed of two inclined planes 65 and 66. As indicated above, the geometry of the protuberance 64 depends on the shape of the flap to be processed and therefore the two inclined planes 65 and 66 may present different inclinations to be determined from case to case according to the extent of the downward displacement to be applied to the flap 61. Since the flaps 61 and 67 are both "composite" flaps, and for the flap 67, the protuberance 64 of course present inclined planes 65 and 66 whose inclination will be the inverse of that common for the flap 61. In an embodiment of the upper member 39, the diameter of the cylindrical body 62 is chosen so that the distribution of the protuberance 64 on its circumference causes them to coincide with the position of the flap 61 and 67 of successive box blanks 60 arriving under the upper member 39 and carried in synchronized rotation with the rotation of the cutting means 16 and 17 of the preceding cutting station 15 which synchronized rotation is obtained for example by means of a gear train that joins the operation of the cutting means 16 and 17 to the operation of the upper rotating member 39 and rotating member 54 of the means 18 for controlling and finishing the cuts. In another embodiment, one, two or several protuberances 64 could be placed on the circumference of the upper rotating means 39 and its rotation driven by a suitable motor so that its rotational speed is such that the protuberance 64 come successively into contact with the flaps 61 and 67 to be processed.

Figure 5:
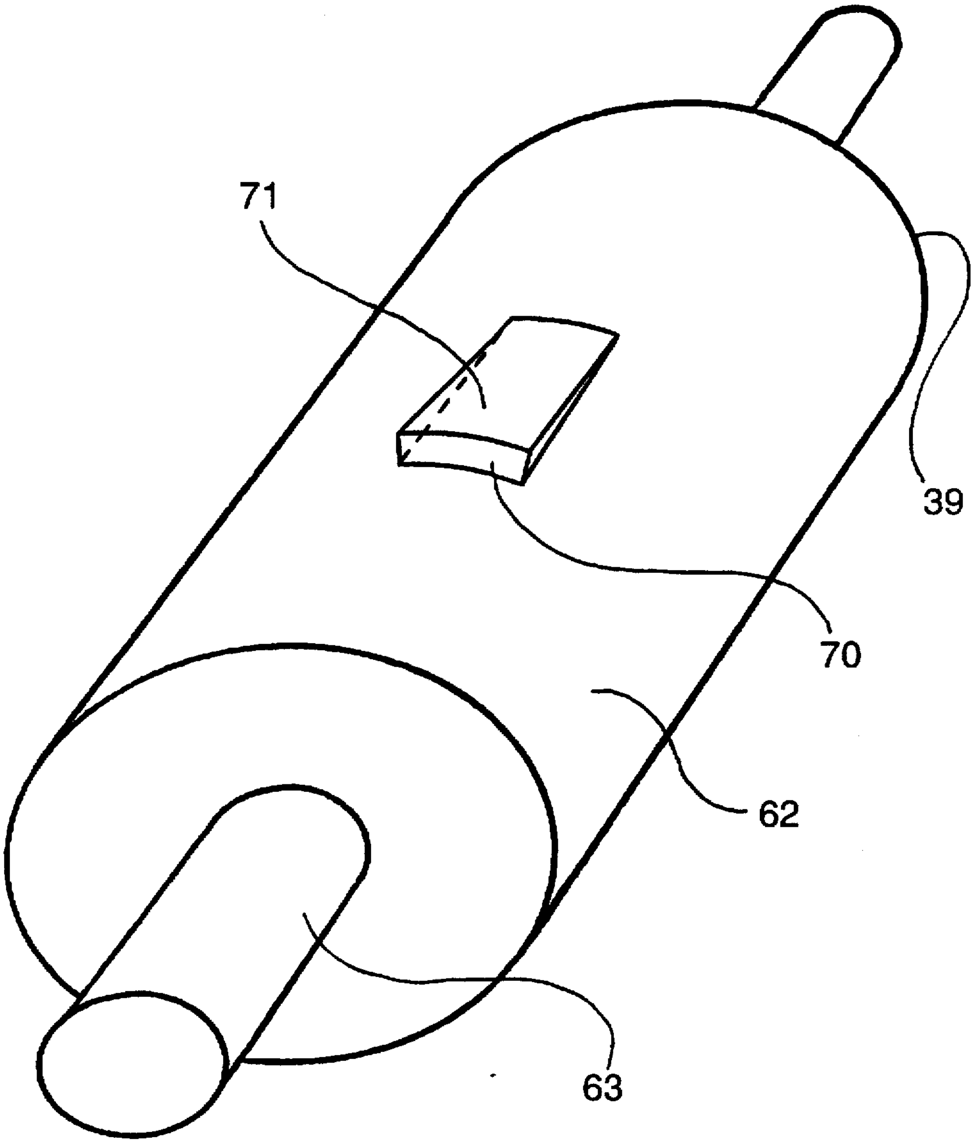
FIG. 5 is a perspective view of a cutting part of the upper means for controlling and finishing the cutting of a second type of flap of a box blank.

A perspective view a cutting part of the upper member 39 for controlling and finishing cuts shown in FIG. 5 and this member is for processing a second flap 68 or 69 of the box blank 60 of FIG. 3. This member has a cylindrical body 62' which is arranged so as to present at least one protuberance 70 whose geometry is defined according to the shape of a flap 68 or 69 which is to be processed. In the case of this flap 68, the protuberance 70 presents a simple surface comprising an inclined plane 71. As indicated above, the geometry of the protuberance 70 depends on the shape of the flap 68 to be processed and therefore the inclined plane 71 will present an inclination that will be determined from case to case according to the amount of downward displacement to be applied to the flap 68. Due to the fact that the flap 68 and 69 are "simple flaps", the protuberance 70 will of course present an inclined plane 71 whose inclination will be in the same direction for the two flaps 68 and 69. As in the case of the upper rotating member for processing the flaps 61 and 67, the diameter of the cylindrical body 62' is chosen so that the distribution of the protuberance 70 on its circumference causes these to coincide with the position of the flap 68 and 69 of the box blank 60 successively arriving under the upper rotating member 39 carried in synchronized rotation with the rotation of the cutting means or members 16 and 17 of the preceding cutting station 15. Here as well, one or two or several protuberances 70 may be placed on the circumference of the rotating member 62' and its rotation is driven by a suitable motor in such a manner that its rotational speed is such that the protuberances 70, successively into contact with the flap 68 and 69 which are to be processed.

Figure 6:
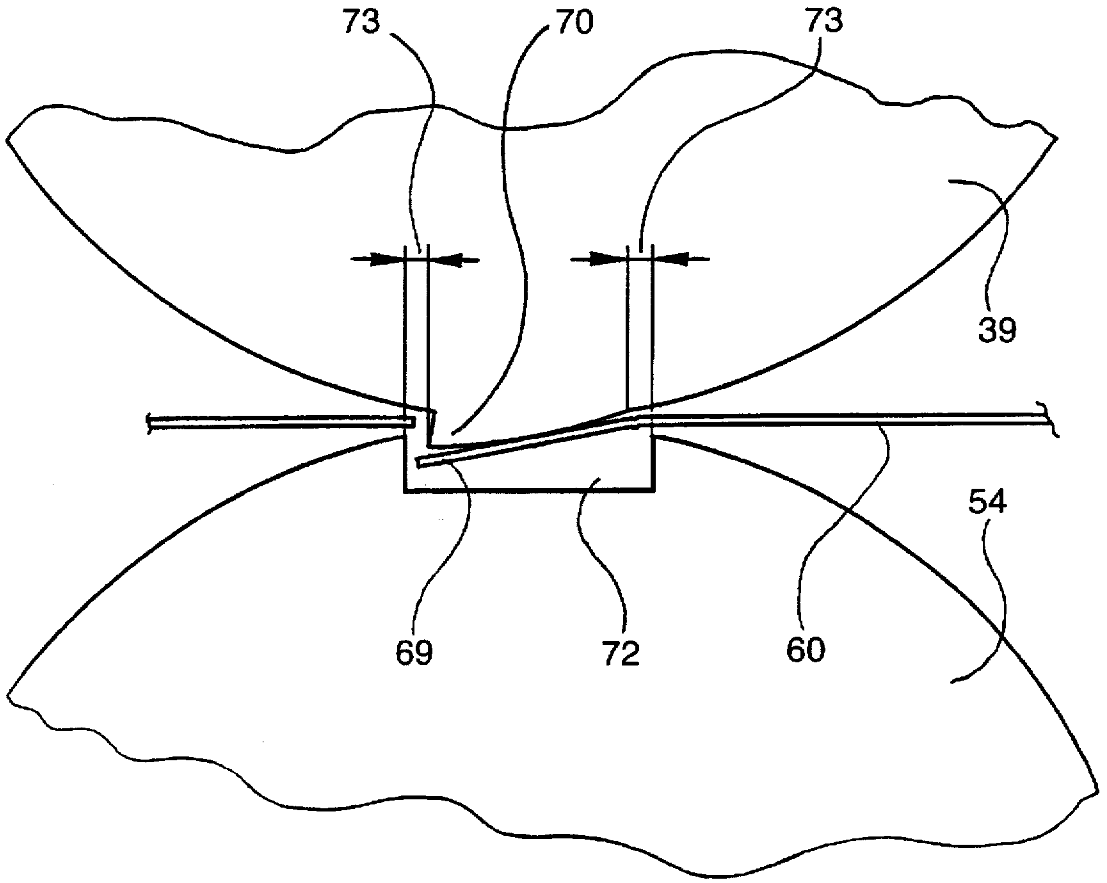
FIG. 6 is a partial cross sectional view of the cutting parts of the upper and lower means for controlling and finishing of a cut.

The rotating members 62 or 62' cooperate with lower members such as 54 illustrated in FIG. 6. The lower member 54 is provided with countersunk openings or recess 72 which is provided in the circumference of this lower member 54. Thus, the protuberance 70 of the upper member will then bend the flap such as 69 out of the plane of the box blank 60 into this opening or recess 72. The size of the opening 72 is chosen so as to realize a periphery gap 73 all around the protuberance 70 of the upper member 30 forming the upper means 39. The aim of this peripheral gap 73 is to permit an effective action on the flap 69 even in the case of variations in the relative position of the flap 69 to the protuberance 70, which can come about for example due to defects in the registration caused in the conveying of the box blank 60 between the exit from the cutting station 15 and the means 18 for controlling and finishing the cutting.

All of the flaps 61, 67, 68 and 69 have been processed by the means 18 for controlling and finishing the cutting and are then rolled by the pressure roller 40 back into the plane of the blank 60 in such a way that each box blank 60 once again presents a perfectly uniform plane necessitated by their subsequent conveying towards the exit of the box cutting machine. In other words, the roller 40 coats to force each of the flaps which have been bent out of the plane of the blank back into the plane of the blank.

The various protuberances 64 and 70 can be machined into the surfaces of the cylindrical body 62 or 62' and the opening 72 may be machined into the cylindrical body such as 54. However, it is also possible to form the protuberances as individual elements that are subsequently mounted in their appropriate place on the circumference of the members 62 and 62' and to machine the openings into a cylindrical shell which is then telescopically mounted on the member. In this case, it would be possible to choose a different material for these individual elements, for example, a material which is more easily machined such as a plastic, fiber or rubber of a significant hardness. In addition, its conceivable that the protuberances such as 64 and 70 should not present a flat surface but rather a surface made up of a succession of small pins or points so as to act only on the areas of the flap such as 61, 67, 68 and 69 that are to be processed.

The utilization of the rotating cutting apparatus such as the one mentioned hereinabove permits the insurance of an optimum production with no cutting faults of box blanks by means of the fact that the cutting of the paper or the cardboard at the level of the various flaps in the box blanks is simultaneously controlled and perfected in the case of an imperfect or incomplete cut but choosing the extent of the deformation of the flaps 61, 67, 68 and 69 by adjustment of the height of the protuberances such as 64 and 70. Due to the peripheral gap 73, it is not necessary to provide a high degree of dimensional precision for the protuberances 64 and 70 or for the countersunk opening 71 which allows the upper means or member 39 and the lower member or means 54 to be realized at relatively low cost.

Although various minor modifications may be suggested by those versed in the art, it should be understood that I wish to embody within the scope of the patent granted hereon all such modifications as reasonably and properly come within the scope of my contribution to the art.

I claim:

1. In a rotating cutting apparatus for processing materials including paper and cardboard, said apparatus having arranged sequentially a supply station, a station for conditioning the material to be processed, a printing station, a station for embossing, pressing and cutting and a station for receiving the objects produced by the apparatus, the improvements comprising means for controlling and finishing of the cutting being arranged between the cutting station and the receiving station, said means for controlling and finishing of the cutting comprising a conveyor means for the box blanks, means for acting on flaps of the box blanks and means for rolling the box blanks, said conveying means for the box blanks being made up of a first group of lower belt conveyors and a second group of lower belt conveyors arranged with the belt conveyors of the second group being disposed between the belt conveyors of the first group, the belt conveyors of the first group having a gap therebetween at the means for acting on the flaps and the belt conveyors of the second group extending on either side of the means for acting on the flaps, the second group of conveyors being associated with an upper conveyor which is placed on either side of the means for acting on the flaps, and vacuum chambers being arranged beneath the carrier runs of the belts of the lower belt conveyors.

2. In a rotating cutting apparatus according to claim 1, wherein the means for acting on the flaps are made up of a rotating upper member and a lower rotating member, the rotating upper member having at least one protuberance provided on a circumference, said protuberance acting jointly with a recess formed in a circumference of the lower rotating member, the geometry of said protuberance being determined by the shape of a flap to be processed.

3. In a rotating cutting apparatus according to claim 2, wherein the protuberance acts on a "composite flap" and comprises two inclined planes.

4. In a rotating cutting apparatus according to claim 2, wherein the upper rotating member and the lower rotating member comprise a plurality of protuberances and of recesses distributed on their circumference according to the respective position of the flaps on the box blanks.

5. In a rotating cutting apparatus according to claim 2, wherein the recesses are machined so as to leave a peripheral gap all around the protuberances.

6. In a rotating cutting apparatus according to claim 2, wherein the protuberances are machined in individual elements mounted on the circumference of the upper member and the recesses are formed in a shell mounted on the lower rotating member.

7. In a rotating cutting apparatus according to claim 2, wherein the protuberance acts on a simple flap and comprises a single inclined plane.

8. In a rotating cutting apparatus according to claim 1, wherein the means for rolling the box blanks comprises a pressure roller acting on the box blanks by pressing the blanks against a carrier run of a lower conveyor, said carrier run being supported by a support panel.

9. In a rotating cutting apparatus according to claim 1, wherein the means acting on the flaps is arranged in a cartridge insertable into the apparatus.

10. In a rotating cutting apparatus according to claim 1, wherein the means for acting on the flaps and the means for rolling the box blanks are arranged in a cartridge insertable into the apparatus.

11. In a rotating cutting apparatus for processing materials including paper and cardboard, said apparatus having arranged sequentially a supply station, a station for conditioning the material to be processed, a printing station, a station for embossing, pressing and cutting and a station for receiving the objects produced by the apparatus, the improvements comprising means for controlling and finishing of the cutting being arranged between the cutting station and the receiving station, said means for controlling and finishing of the cutting comprising a conveyor means for the box blanks, means for acting on flaps of the box blanks and means for rolling the box blanks, said means for acting on the flaps being made up of a rotating upper member having at least one protuberance provided on a circumference and a lower rotating member having a shell mounted thereon, said shell having a recess for each protuberance to act jointly therewith, said protuberances being individual elements mounted on the circumference of the upper member and the geometry of said protuberance being determined by the shape of a flap to be processed.

12. In a rotating cutting apparatus according to claim 11, wherein the protuberance acts on a "composite flap" and comprises two inclined planes.

13. In a rotating cutting apparatus according to claim 11, wherein the upper rotating member and the lower rotating member comprise a plurality of protuberances and of recesses distributed on their circumference according to the respective position of the flaps on the box blanks.

14. In a rotating cutting apparatus according to claim 11, wherein the recesses are machined so as to leave a peripheral gap all around the protuberances.

15. In a rotating cutting apparatus according to claim 11, wherein the protuberance acts on a simple flap and comprises a single inclined plane.

16. In a rotating cutting apparatus according to claim 11, wherein the means for rolling the box blanks comprises a pressure roller acting on the box blanks by pressing the blanks against a carrier run of a lower conveyor, said carrier run being supported by a support panel.

17. In a rotating cutting apparatus according to claim 11, wherein the means acting on the flaps is arranged in a cartridge insertable into the apparatus.

18. In a rotating cutting apparatus according to claim 11, wherein the means for acting on the flaps and the means for rolling the box blanks are arranged in a cartridge insertable into the apparatus.

* * * * *